(12) United States Patent
Seymour et al.

(10) Patent No.: US 11,994,665 B2
(45) Date of Patent: May 28, 2024

(54) SYSTEMS AND METHODS FOR PROCESSING ELECTRONIC IMAGES OF PATHOLOGY DATA AND REVIEWING THE PATHOLOGY DATA

(71) Applicant: PAIGE.AI, Inc., New York, NY (US)

(72) Inventors: Sam Seymour, Portland, OR (US); Todd Parker, San Diego, CA (US); Alican Bozkurt, New York, NY (US); Christopher Kanan, Pittsford, NY (US); Jeremy Daniel Kunz, New York, NY (US)

(73) Assignee: Paige.AI, Inc., New York, NY (US)

( * ) Notice: Subject to any disclaimer, the term of this patent is extended or adjusted under 35 U.S.C. 154(b) by 0 days.

(21) Appl. No.: 17/815,034

(22) Filed: Jul. 26, 2022

(65) Prior Publication Data

US 2023/0031240 A1    Feb. 2, 2023

Related U.S. Application Data

(60) Provisional application No. 63/261,337, filed on Sep. 17, 2021, provisional application No. 63/226,661, filed on Jul. 28, 2021.

(51) Int. Cl.
*G02B 21/36* (2006.01)
*G06T 7/70* (2017.01)

(52) U.S. Cl.
CPC ......... *G02B 21/365* (2013.01); *G02B 21/368* (2013.01); *G06T 7/70* (2017.01)

(58) Field of Classification Search
CPC ............................... G02B 21/365; G06T 7/70
USPC .......................................................... 348/80
See application file for complete search history.

(56) References Cited

U.S. PATENT DOCUMENTS

2018/0031817 A1*  2/2018  Barral .................... G16H 30/20
2018/0188519 A1*  7/2018  Wirch .................. G02B 21/365

* cited by examiner

*Primary Examiner* — Amir Shahnami
(74) *Attorney, Agent, or Firm* — Bookoff McAndrews, PLLC

(57) ABSTRACT

A computer-implemented method of reviewing digital pathology data may include receiving a digital pathology image into a digital storage device, the digital pathology image being associated with a patient, providing for display the digital pathology image on a display, pairing the digital pathology image with a physical token of the digital pathology image in an interactive system, receiving one or more commands from the interactive system, determining one or more manipulations or modifications to the displayed digital pathology image based on the one or more commands, and providing for display a modified digital pathology image on the display according to the determined one or more manipulations or modifications.

20 Claims, 11 Drawing Sheets

SYSTEMS AND METHODS FOR PROCESSING ELECTRONIC IMAGES OF PATHOLOGY DATA AND REVIEWING THE PATHOLOGY DATA

RELATED APPLICATION(S)

This application claims priority to U.S. Provisional Application Nos. 63/226,661 filed Jul. 28, 2021 and 63/261,337 filed Sep. 17, 2021, the entire disclosures of which are hereby incorporated herein by reference in their entireties.

FIELD OF THE DISCLOSURE

Various techniques presented herein pertain generally to image processing methods. More specifically, particular techniques of the present disclosure relate to systems and methods for processing and reviewing digital pathology data, including navigating a collection of one or more whole slide images (WSIs), using an interactive system that is optimized for the practice of digital pathology.

BACKGROUND

Traditional microscopy is used to review glass slides for the presence or absence of clinical or other features needed to conduct research or diagnose a tissue specimen. These applications range from determining if a drug has acceptable toxicity levels in a research animal, to determining if a human has cancer, to determining if a human has inflammatory bowel disease, etc. With traditional microscopes, pathologists use their hands to manipulate glass slides directly, as well as to manipulate mechanical components, including stage clips, stage controls, objective lenses, and course and fine adjustments, that assist them in slide manipulation during the course of their review. Using these tools in concert may allow for highly efficient navigation of the glass slide, such as moving from coarse, low magnification manipulation to fine, high magnification while reviewing microscopic components.

Digital pathology may address inefficiencies with storage and retrieval of glass slides, with slides being scanned at high magnification levels and placed in electronic storage for real time viewing on a computer monitor. However, existing digital pathology techniques may be inefficient and/or cumbersome when combined with existing or traditional microscopes or other devices.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for processing and reviewing digital pathology data.

In accordance with techniques presented herein, a computer-implemented method is disclosed for reviewing digital pathology data, the method comprising: receiving a digital pathology image into a digital storage device, the digital pathology image being associated with a patient, providing for display the digital pathology image on a display, pairing the digital pathology image with a physical token of the digital pathology image in an interactive system, receiving one or more commands from the interactive system, determining one or more manipulations or modifications to the displayed digital pathology image based on the one or more commands, and providing for display a modified digital pathology image on the display according to the determined one or more manipulations or modifications.

In accordance with other techniques presented herein, a system is disclosed for reviewing digital pathology data, the system comprising: a data storage device storing instructions for reviewing digital pathology data in an electronic storage medium; and a processor configured to execute the instructions to perform a method including: receiving a digital pathology image into a digital storage device, the digital pathology image being associated with a patient, providing for display the digital pathology image on a display, pairing the digital pathology image with a physical token of the digital pathology image in an interactive system, receiving one or more commands from the interactive system, determining one or more manipulations or modifications to the displayed digital pathology image based on the one or more commands, and providing for display a modified digital pathology image on the display according to the determined one or more manipulations or modifications.

In accordance with further techniques presented herein, a non-transitory machine-readable medium storing instructions that, when executed by a computing system, causes the computing system to perform a method for reviewing digital pathology data, the method including: receiving a digital pathology image into a digital storage device, the digital pathology image being associated with a patient, providing for display the digital pathology image on a display, pairing the digital pathology image with a physical token of the digital pathology image in an interactive system, receiving one or more commands from the interactive system, determining one or more manipulations or modifications to the displayed digital pathology image based on the one or more commands, and providing for display a modified digital pathology image on the display according to the determined one or more manipulations or modifications.

Additional objects and advantages of the techniques presented herein will be set forth in part in the description that follows, and in part will be apparent from the description, or may be learned by practice of the techniques presented herein. The objects and advantages of the techniques presented herein will be realized and attained by means of the elements and combinations particularly pointed out in the appended claims.

It is to be understood that both the foregoing general description and the following detailed description are exemplary and explanatory only, and are not restrictive of the techniques presented herein, as claimed.

BRIEF DESCRIPTION OF THE DRAWINGS

The accompanying drawings, which are incorporated in and constitute a part of this specification, illustrate various exemplary techniques and together with the description, serve to explain the principles of the disclosed techniques.

DESCRIPTION OF THE EMBODIMENTS

Figure 1:
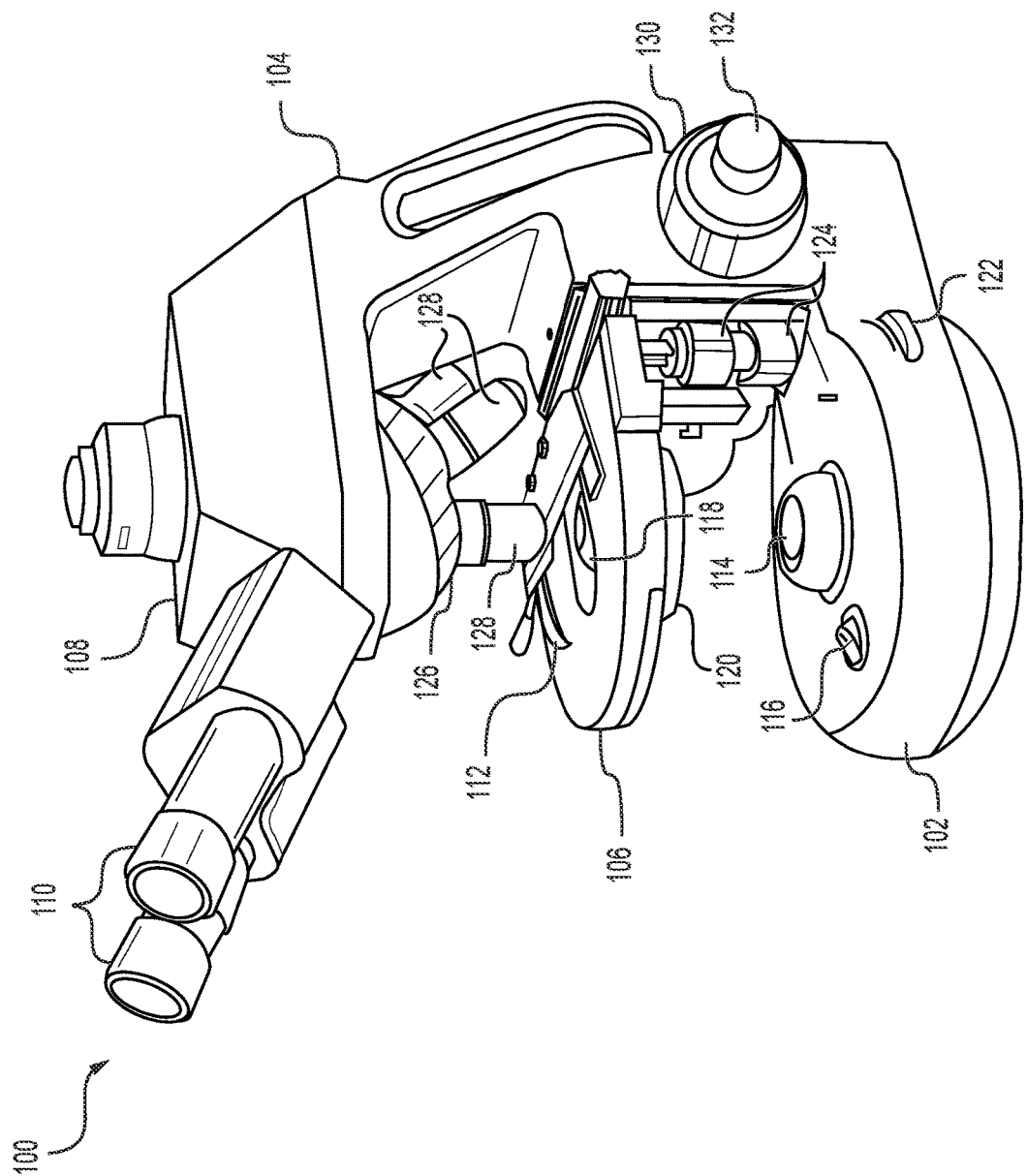
FIG. 1 illustrates an exemplary traditional microscope.

Reference will now be made in detail to the exemplary techniques presented herein, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

While digital pathology may address storage and retrieval problems associated with glass slides, existing digital pathology technologies for reviewing digital slides are not ideal. Digital whole slide image viewing interfaces may attempt to replicate a traditional microscope experience with software features that may be combined with typical input devices (e.g., standard computer mouse and/or keyboard) to interact with digital medical images (e.g., digital histology slides) or whole slide images (WSIs). For example, typical input devices may be used to manipulate such as to rotate, pan across, and/or zoom in and out of WSIs. These digital versions of traditional microscopy may not be well matched to a microscope experience and may require a significant increase in repetitive motion.

As a result, image viewing and navigation may be more cumbersome and slower than microscopy while also exposing a user to repetitive motion injuries, and beyond. Many pathologists who routinely review WSIs report arm and wrist fatigue due to physically moving the mouse to pan and/or zoom across large areas tissue while reviewing many cases each day, where each case may consist of over one hundred WSIs. All slides within each case must be reviewed by the pathologist to ensure a correct diagnosis, as features that may be critical to determining the correct diagnosis may be small and isolated to a single slide.

Tissue on a specific slide may include "white space," or significant regions that do not contain any tissue, separating a tissue of interest. Such slides may require additional panning and zooming by the pathologist in order for a full review. Moreover, when multiple slides belong to a case, the pathologist may need to navigate among the multiple slides to do a proper assessment. While standard input devices, such as a keyboard, a mouse, or a touchscreen, may be used to mimic a navigational functionality of viewing a glass slide on a microscope, these typical input devices were not designed with digital pathology in mind. As noted above, repetitive clicking actions, wrist movements, and switching between mouse and keyboard may lead to a suboptimal workflow, as these actions may be both inefficient and the cause of repetitive motion injury. Many other fields have developed specialized input devices for unique or niche workflows, for example computer aided design and drafting (CADD), digital animation, video gaming, etc.

Aspects disclosed herein may provide a combined set of specialized input devices for navigating a digital whole or partial slide image viewing interface. Aspects disclosed herein may be designed to allow users to interact with the whole slide image viewing interface while providing an experience that may be efficient and similar to traditional glass slide review on the microscope stage.

Exemplary techniques presented herein may bridge the current world of how pathologists interact with glass slides in a digital world, and drive or encourage digital adoption and change. For example, techniques presented herein may provide a controller or a transition device to onboard pathologists, which may assist trainees in bridging the worlds of artificial intelligence (AI), digital pathology, and traditional compound microscopes. Additionally, techniques presented herein may benefit a user by easing a transition from analog glass slide review to digital slide review, allowing for a more efficient navigation of slides and cases compared to a standard input device, and reducing likelihood of strain and repetitive motion injuries due to a reduction in a user's wrist movements and clicks.

Techniques presented herein may provide a controller including a physical token of a digital pathology image, such as a smart physical slide (which may be made of a rigid or semi-rigid material such as glass, metal, plastic, rubber, silicone, etc.), and a surface configured to support the physical token, such as a stage. The surface, or stage, may include additional functionality, such as a touchscreen display to present information regarding the token or the associated data or to receive user inputs or commands. Further details of the surface, or stage, are discussed below with respect to trackpad 306 depicted in FIGS. 3A-3D. The smart physical slide, also referred to herein as a "smart slide", may contain elements or sensors that allow the controller (or alternatively, another controller or processor in communication with the controller) to determine the smart slide's orientation and location in 3D space. The determination of the smart slide's orientation and/or location may be relative to the stage or support. A movement of the smart slide in proximity to the stage may be transmitted digitally. These actions may be reflected on a digital viewing platform (such as, for example, a computer screen, head mounted display, tablet, mobile device, video projector, etc.). The controller may be implemented, for example, as a mock microscope so as to mimic or approximate one or more behaviors of a real microscope.

FIG. 1 depicts a traditional microscope 100 used for pathology slide review. The traditional microscope 100 may include a base 102, an arm 104 extending from the base 102, a mechanical stage 106 supported by the base 102 and/or the arm 104, a head 108 extending from the arm 104, and an eyepiece and/or pair of ocular lenses 110 extending from the head 108. A slide may be placed on the mechanical stage 106 and secured via a stage clip 112. A light device 114 may be provided on the base 102 under the mechanical stage 106 and be configured to switch on via light switch 116 to illuminate the slide through an aperture or opening 118 of the mechanical stage 106. A condenser 120 may be provided under the aperture 118 of the mechanical stage 106 to assist in focusing or condensing light illuminated by the light device 114, and a brightness of the light may be adjusted by a brightness adjustment device 122. A height of the mechanical stage 106 may be controlled by one or more stage controls 124. A magnification of an image of the slide on the mechanical stage 106 as seen through the ocular lenses 110 may be controlled by rotating a nose piece or dial 126 having a plurality of (e.g., three) objective lenses 128 forming an objective assembly. A course adjustment knob 130 and/or a fine adjustment knob 132 may be used to help focus and/or clarify the image seen through the ocular lenses 110.

Traditional microscopy may have significant limitations compared to digital pathology. However, it may also have a one or more advantages over conventional digital methods. For example, users may move around a physical slide on the mechanical stage 106 while viewing the slide. Aspects disclosed herein may enable users to use a physical token of a digital pathology image, such as a "slide device," or "smart device" (e.g., smart microscope) that may closely resemble traditional user "inputs" of a traditional microscope to adjust a field of view, which may improve ergonomic functionality for users viewing digital slides. Aspects disclosed herein may also enable users to use a "smart slide," as a physical token of a digital pathology image, separately from or in combination with the "smart device" to enable analysis of the slide.

Figure 2:
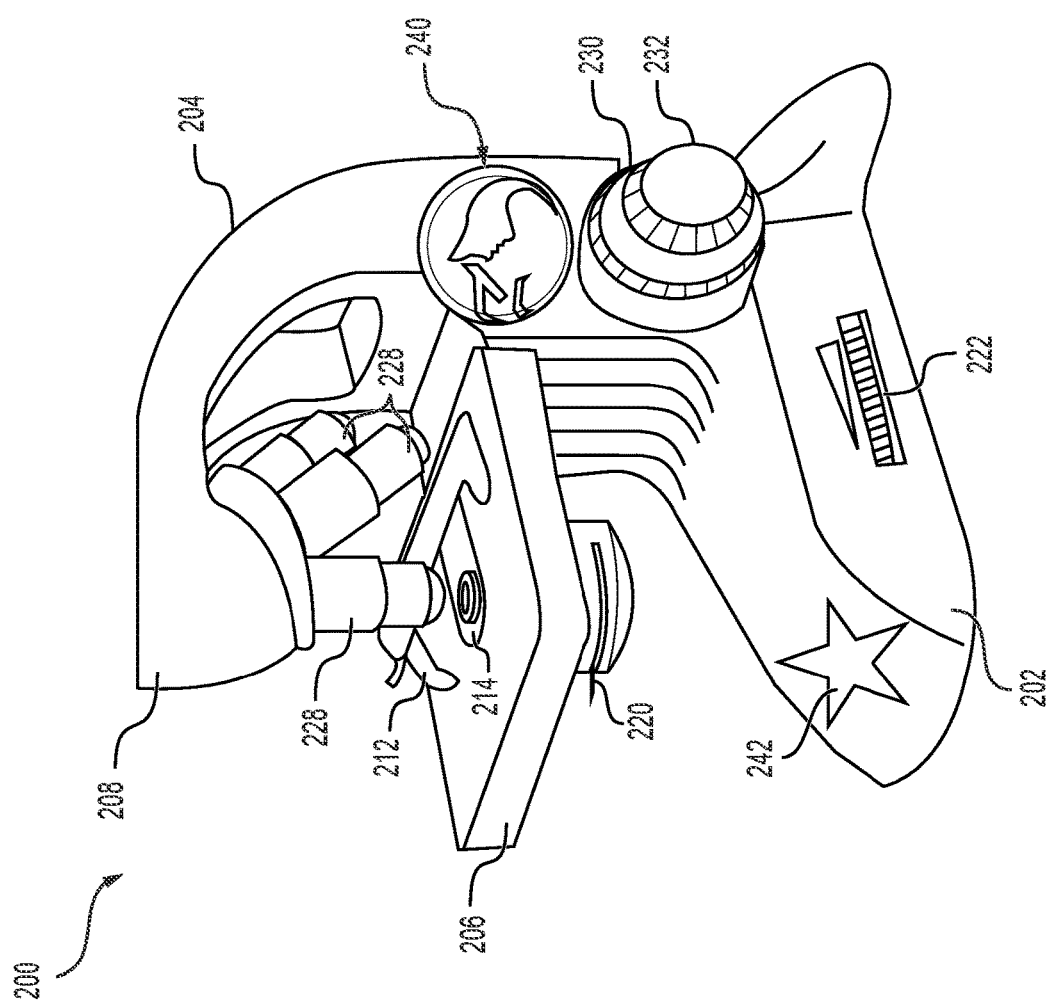
FIG. 2 illustrates a mock microscope controller according to an exemplary technique presented herein.

Referring to FIG. 2, an exemplary controller 200 may resemble the traditional microscope 100 in one or more respects, but controllers 200 disclosed herein are not limited to "smart" or "mock" microscopes. For example, controller 400 described in reference to FIG. 4A may resemble a "smart" or "mock" gamepad or joypad.

Controller 200 may share one or more features of traditional microscope 100, but may omit, for example, the eyepiece or ocular lens 110. For example, the controller 200 may include a base 202, an arm or carrying handle 204 extending from the base 202, a stage 206 supported by the base 202 and/or the arm 204, and a head 208 extending from the arm 204. Stage 206 may include additional functionality, such as a touchscreen display to present information regarding the token or the associated data or to receive user inputs or commands. Such additional functionality of stage 206 are discussed below with respect to trackpad 306 depicted in FIGS. 3A-3D. A slide (e.g., a physical slide or a smart slide described later) may be placed on the stage 206 and secured via a slide holder 212. A light 214 may be provided to illuminate the slide on the stage 206. A condenser 220 aperture lever may be provided under the stage 206. Light may be adjusted by a brightness adjustment and/or a light intensity control 222. The controller 200 may also include a mock objective assembly 228 and adjustment inputs such as a course adjustment knob or wheel 230, a fine adjustment knob or wheel 232, an artificial intelligence (AI) adjustment knob, wheel, or sphere 240, and/or additional buttons or inputs. The controller 200 may further include an archive button 242.

The mock objective assembly 228 may be formed to resemble the objective assembly of the traditional microscope 100, or other designs may be employed, such that the mock objective assembly 228 may be, for example, simpler, less expensive, more easily manipulated, etc. The mock objective assembly 228 may be used, for example, to change magnification. For example, a user may push mock objective assembly 228, which may cause mock objective assembly 228 to rotate, and such rotation may change the magnification of the displayed image, for example, from 40× to 20×. That is, pushing mock objective assembly 228 may simulate changing objectives on a traditional microscope. Although there may be no real objective present, mock objective assembly 228 may be formed so as to have a similar feel and weight as an objective assembly on a traditional microscope so as to give a user an impression of working with a traditional microscope. Other motions of mock objective assembly 228 may be employed for similar functionality, including, for example, depressing, pulling, rotating, etc. Alternatively, mock objective assembly 228 may be fixed in place and may employ other user interfaces, such as a button, switch, or touch surface, to effect similar functionality. The operation of mock objective assembly 228, and the effects of particular manipulations of mock objective assembly 228, may be customized by a user, such as through viewing application tool 508, described below.

The fine adjustment wheel 232 may, for example, provide an artificial blur in a viewing platform, may be used for continuous magnifications, or may provide other controls.

The AI adjustment wheel 240 may be rotated to flip through different visualizations, which may be provided, for example, by tissue viewing platform 500, described below. For example, each turn may rotate through different visualizations such as, for example, a tissue map visualization, a tissue hop visualization, or a point of focus visualization, etc. The AI adjustment wheel 240 and/or another button, knob, or other adjustment input included in the controller 200 may be manipulated (e.g., pushed in, tapped, moved laterally, etc.) to advance to (and/or display) another (or next) slide or case. The AI adjustment wheel 240 and/or another button, knob, or other adjustment input included in the controller 200 may be manipulated (e.g., pushed in, tapped, moved laterally, etc.) to go back to or display a worklist.

The archive button 242 may be a mechanical switch or button, or may be a touch- or pressure-sensitive surface, and may be used to star or flag a slide or visualization, add a slide or visualization to a particular collection, and/or to archive the slide or the current visualization.

The controller 200 may include various other buttons, knobs, etc. to mark a slide or visualization (e.g., for further analysis or to set a priority level), etc. For example, the controller 200 may include a stain ordering button to initiate an automatic ordering of an additional slide to be prepared that includes one or more stains based on an analysis of the current slide or visualization.

The controller 200 may omit unnecessary and/or expensive materials or parts used in other microscopes, such as the traditional microscope 100. For example, although the controller 200 may appear similar to a microscope, the controller may omit an ocular lens, as a pathologist or user may instead view the slides on another display (e.g., computer screen or other electronic display), which may enlarge the images. The controller 200 may also omit expensive objectives and may instead include "mock" objectives (e.g., within the mock objective assembly 228) or alternatively omit objectives entirely. The controller 200 may omit cameras or other devices that may be included in traditional microscopes.

The controller 200 may have a variety of implementations and may come in limited editions or be personalized. For example, colors may be customized. Example colors for the controller 200 may be created, for example, via titanium anodizing for purple and blue colors (or anodized aluminum), titanium nitride PVD (physical vapor deposition), and/or platinum CVD (chemical vapor deposition), etc. Customized applied graphics, paint or other surface coloring, engravings, etc., may also be provided.

A weight of the controller 200 may also be customizable, before or after manufacturing. The controller 200 may include a flexible weight module where one or more weights may be added or removed to give the controller 200 a desired weight, such as a weight comparable to that of a compound microscope (e.g., 8 pounds (lb) or 3.6 kilograms (kg)). A material of the controller 200 could be rigid, such as a metal (e.g., iron or steel), a dense plastic, etc. As an alternative to having dimensions that are similar to a traditional compound microscope (such as the traditional microscope 100 of FIG. 1), the controller 200 may be implemented as a "travel edition," which may be compact and have a lower weight and height than a traditional compound microscope.

The controller 200 may also be configured to provide feedback (haptic, tactile, audio, visual, etc.). For example, the controller 200 may sound an alarm, emit a light, vibrate, or provide some other audio, visual, and/or tactile notification when a slide is placed incorrectly on the stage 206, when a magnification is increased, etc. In another example, a portion of the controller 200 may provide a notification to indicate that a slide shows features of interest, including features indicative of disease such as cancer, which may be determined by a slide analysis tool described in more detail with reference to FIGS. 5A-5C. In another example, the controller 200 may provide different or graded notifications (e.g., shake more strongly or emit different colored lights) when viewing high-grade cancer vs low-grade cancer, which may further be determined by the slide analysis tool.

Figure 3B:
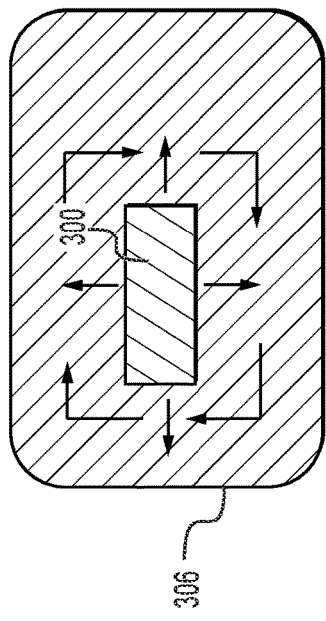
FIG. 3B illustrates navigation of a slide device along a trackpad according to an exemplary technique presented herein.
Figure 3D:
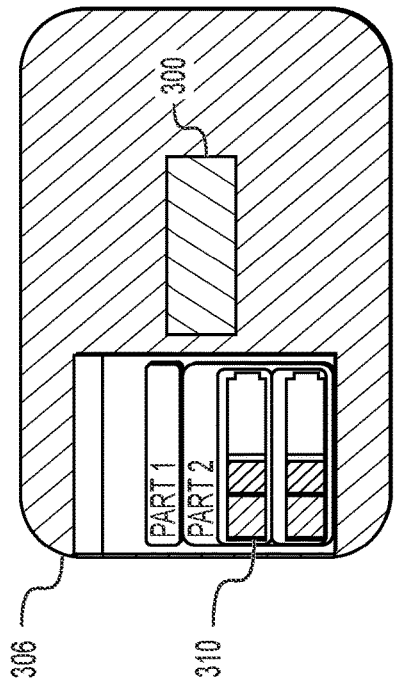
FIG. 3D illustrates a touchscreen for navigating a slide device along a trackpad according to an exemplary technique presented herein.
Figure 3A:
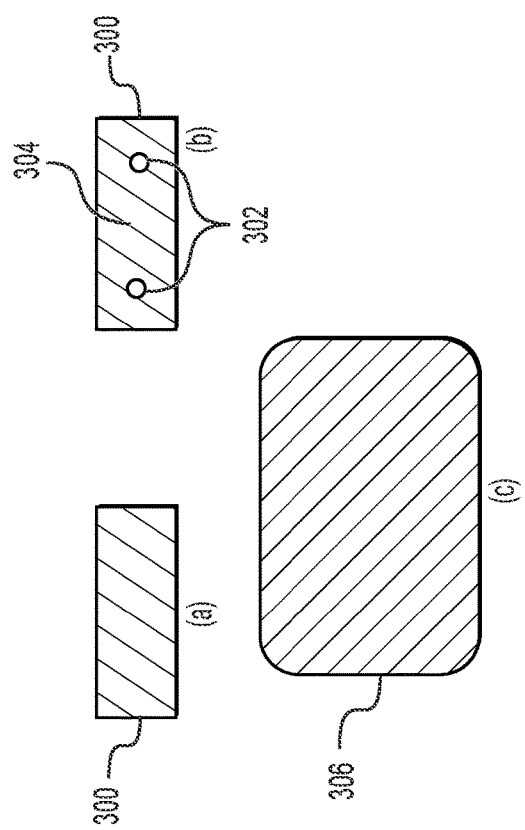
FIG. 3A illustrates a slide device according to an exemplary technique presented herein.

Referring to FIG. 3A, an exemplary physical token of a digital pathology image, such as slide device 300, or "smart slide" or "smart device," may be used with or without the controller 200. FIG. 3A, view (a) shows a top view of the slide device 300, and FIG. 3A, view (b) shows a bottom view of the slide device 300. FIG. 3A, view (c) shows an exemplary trackpad 306 including a surface configured to support the slide device 300. Although depicted as a separate element in FIGS. 3A-3D, trackpad 306 may be incorporated into other elements of the system, such as, for example, stage 206 of controller 200 depicted in FIG. 2 and discussed above.

The slide device 300 may be a physical device in the shape of a slide and have similar dimensions to a typical glass slide used with a microscope. The slide device 300 may be laid upon or held in proximity to a surface of the trackpad 306 and may be moved relative to the trackpad 306. The slide device 300 may not necessarily include a specimen on the slide. Rather, the slide device 300 may be configured to be paired with a digital image or WSI of a previously captured or acquired specimen, and hence the slide device 300 may alternatively be referred to as a slide stylus, a stylus device, or an electronic slide. The slide device 300 may be controlled, via user input, to be paired with a next WSI and/or to advance to another or next WSI. The slide device 300 may be associated with a unique identifier or serial number and may be equipped with an internal communication device, such as, for example, a near field communication (NFC), radio frequency identification (RFID), etc., such that each slide device 300 may be uniquely identified. The unique identification of the slide device 300 may allow for the slide device 300 to be uniquely paired with an item of information, such as a digital image or WSI of a previously captured or acquired specimen. Such a unique pairing may allow for automatic retrieval of the paired information when the slide device 300 is selected. Such automatic retrieval may be initiated, for example, when the slide device 300 is presented to a reader, such as an NFC or RFID reader (not shown). An NFC or RFID reader may be provided as part of the trackpad 306, the controller 200, and/or as an external device.

The trackpad 306 may be implemented as a microscope stage, such as the stage 206 of the controller 200, or alternatively may be a separate structure or trackpad, such as a smart trackpad provided on or implemented as the mechanical stage 106 of the traditional microscope 100, a trackpad implemented as or on a tablet or another electronic device, or a separate trackpad that could be provided on a table or working space.

Figure 3C:
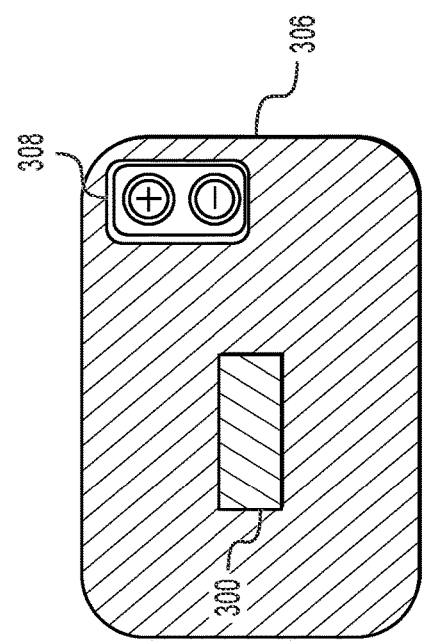
FIG. 3C illustrates an interface for navigating a slide device along a trackpad according to an exemplary technique presented herein.
Figure 3E:
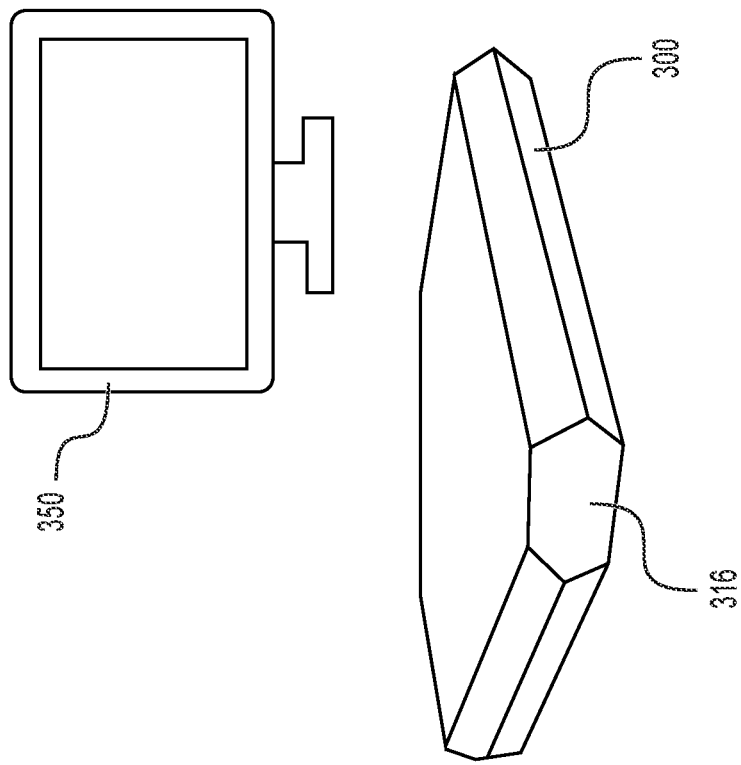
FIG. 3E illustrates a slide device according to an exemplary technique presented herein.
Figure 3E:
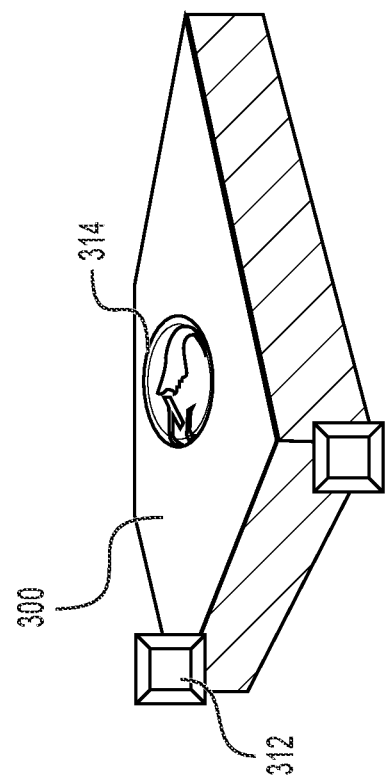

Referring to FIGS. 3A and 3B, as the slide device 300 is moved, a position and/or orientation of the slide device 300 on the trackpad 306 may be sensed, displayed on a display or screen (e.g., an external computer or display such as output device 350 shown in FIG. 3E, a touchscreen 310 provided on the trackpad 306 as shown in FIG. 3D, a tablet, mobile, device, video projector, etc.), and/or recorded. The slide device 300 may comprise one or more hardware components or sensors 302, which may track movement of the slide device 300. Such sensor may include, for example, accelerometers, tilt sensors, vibration sensors, PIR (passive infrared) sensors, rotation sensors, resistive sensors, capacitive sensors, and the like. As an example, the one or more sensors 302 may be provided on a first or bottom surface 304 of the slide device 300 to interact with the trackpad 306. The one or more sensors 302 may include a first sensor 302 provided at a first side of the slide device 300 and a second sensor 302 provided at a second side of the slide device 300. Such a dual-contact point "slide stylus" slide device 300 may aid in understanding orientation of the slide device 300 in a full two dimensions, and may provide an interface familiar to pathologists. The slide device 300 may be moved across the trackpad 306. Additionally, or as an alternative to the slide device 300 including the sensors 302, the trackpad 306 may include a plurality of sensors (e.g., arranged in a grid form) to sense a position of the slide device 300. As an example, the trackpad 306 may include circuitry configured to emit an electromagnetic field (e.g., digitizer), and the slide device 300 may include circuitry and/or magnets that interact with the electromagnetic field of the trackpad 306.

Additionally or alternatively, the slide device 300 may comprise other types of devices to detect, in three-dimensional space, a position, orientation, and movement of slide device 300, including a relative position, orientation, and movement with respect to the trackpad 306. Additionally or alternatively, a system including the slide device 300 and the trackpad 306 may further include cameras, depth sensors, or other sensors to detect a position, orientation, and movement of the slide device 300, the trackpad 306, a user of the system, or other components of the system.

When the slide device 300 is moved by a user, a digital image on an electronic display or screen (e.g., computer screen, output device 350 in FIG. 3E, or another display, such as the touchscreen 310 provided on the trackpad 306 as shown in FIG. 3D) may be modified in a corresponding manner. Such digital image may be referred to as a paired digital image or corresponding digital image. For example, if a user rotates the slide device 300, then the corresponding digital image of the slide on the display may rotate in the same manner. The user may "zoom" in and out using a variety of gestures (e.g., by controlling controller 200, interacting with the slide device 300, and/or interacting with the trackpad 306). For example, the user may interact with the slide device 300, such as by a double tap, multi-touch gesture, etc., or there may be distinct physical or virtual buttons on the trackpad 306 to facilitate this function.

The user may also pair the slide device 300 with a new digital image (e.g., in a set of WSIs or in a case) using a variety of gestures (e.g., a swipe, double-tap, multi-touch gesture, etc.), and the new paired digital image may be displayed. The unique pairing of the slide device 300 with external information may also be updated (e.g., from the previous digital image to the new digital image). Thus, multiple WSIs may be viewed and/or manipulated without actually swapping out different physical slides containing different specimens.

Some examples of the present disclosure, however, may include multiple slide devices 300, where each slide device 300 corresponds to a particular digital slide image and/or represents a specific physical slide, such as through a unique paring of each slide device 300 with stored information. In another example, the multiple slide devices 300 may each correspond to a set of digital images. For example, each slide device 300 may correspond to a set of digital images corresponding to a single patient such that each slide device 300 corresponds to a patient. As another example, each slide device 300 may correspond to a set of digital images corresponding to a tissue type or body part, such that each slide device 300 corresponds to a different tissue type or body part. A user may rapidly switch between the slide devices 300 of one patient or several patients without leaving an environment they are working within. This exemplary technique may be referred to as a totem example.

The user may use the slide device 300 in an augmented reality, a virtual reality, or with a conventional display setup. The slide device 300 may be equipped with near field communication (NFC), radio frequency identification (RFID), or another internal communication device that may enable the system, such as through trackpad 306, to determine which slide device 300 is being used. Alternatively, computer vision may be used to distinguish between different slide devices 300 using object classification methods, e.g., convolutional neural networks trained to distinguish among different slide devices 300. Alternatively, slide devices 300 may be provided with visual unique identifiers, such as serial numbers, bar codes, quick response (QR) codes, etc. Information from such a determination of which slide device 300 is being used may be communicated to a data processing system, such as server system 510, depicted in FIG. 5A, or a component of server system 510, such as any of the components depicted in FIGS. 5A-5C, so as to facilitate the display or further processing of data associated with slide device 300.

Referring to FIG. 3C, the trackpad 306 may include an interface 308, which may comprise a touchscreen, one or more buttons, or other user input. The interface 308 may allow various functions and other navigation of the slide device 300, such as a zoom function to zoom in and out (e.g., such as achieved when increasing/decreasing objective power), to change a slide image displayed on the display and/or paired with the slide device 300, etc.

Referring to FIG. 3D, at least a portion of the trackpad 306 may include a display and/or another platform. For example, the trackpad 306 may include a touchscreen 310, which may allow for navigating the slide device 300 on the trackpad 306. The touchscreen 310 may show a digital image or WSI and allow a user to zoom in or out to review a tissue specimen. The trackpad 306 and/or the touchscreen 310 may be enhanced to include a slide tray to facilitate better interaction with the digital image and/or to better select an image among a plurality of digital images or WSIs to pair with the slide device 300 for display and analysis. For example, the slide tray may include thumbnail images of one or more of the plurality of digital images or WSIs that may be simultaneously displayed and/or selected from.

Referring to FIG. 3E, the slide device 300 may come in different shapes or options (e.g., rectangular, square, with sharp edges, with cut edges, with round edges, with edges 316 cut or ground at a certain angle such as 45 degrees, etc.). Alternative or in addition to sensors 302 (FIG. 3A), the slide device 300 may include one or more elements or sensors 312 placed around the slide device 300 (e.g., at edges or vertices, at left and right sides of a top surface, etc.). An orientation of the slide device 300 (e.g., with respect to the trackpad 306) may be determined using these sensors 312.

When a pathologist or user moves the slide device 300 (e.g., using his or her hands), a movement of the slide device 300 may appear on an output device 350. The output device 350 may include a computer screen, a monitor, a display, a head mounted display, a virtual reality or augmented reality headset or device, a tablet, a mobile device, a video projector, etc. The pathologist may control a movement of the slide device 300 using by physically moving the slide device 300 (rather than through strenuous inputs via a keyboard, a computer mouse, etc.) but may still view the digital image on the output device 350.

The slide device 300 may include one or more indicators 314 (e.g., symbols) provided on a top and/or bottom of the slide device 300. The indicator 314 may be integrated into, engraved in, printed on, etc. a material (e.g., glass) of the slide device 300. The indicator 314 may assist a user in correctly placing the slide device 300 on the trackpad 306. A correct placement on the trackpad 306 may allow a correct determination of the slide's orientation and/or position via sensors 302 and/or sensors 312. Alternatively or in addition thereto, the indicator 314 or a different indicator (e.g., a different symbol) than the indicator 314 if the indicator 314 is provided on the top surface may appear on a bottom surface of the slide device 300 to indicate an incorrect placement.

The slide device 300, the trackpad 306, and/or the output device 350 may be configured to provide feedback (haptic, tactile, audio, visual, etc.). For example, the slide device 300, the trackpad 306, and/or the output device 350 may sound an alarm, emit a light, vibrate, or provide some other notification when a slide device 300 is placed incorrectly on the trackpad 306, when a magnification is increased, etc. In another example, the slide device 300, the trackpad 306, and/or the output device 350 may provide a notification to indicate that a digital image paired with the slide device 300 (and/or a region of the digital image now shown and/or magnified on the output device 350) shows features of interest, including features indicative of disease such as cancer, which may be determined by a slide analysis tool described in more detail with reference to FIGS. 5A-5C. In another example, the slide device 300, the trackpad 306, and/or the output device 350 may provide different or graded notifications (e.g., shake more strongly or emit different colored lights) based on an analysis, determination, or stored information associated with slide device 300, such as when viewing high-grade cancer vs low-grade cancer as determined by the slide analysis tool.

As previously described, the slide device 300 may be used with the controller 200 of FIG. 2, where the trackpad 306 may be implemented in the stage 206. Alternatively or in addition thereto, the controller 200 may include a more traditional or non-sensing stage (e.g., the mechanical stage 106), and the sensors 302 and/or sensors 312 of the slide device 300 may sufficient to determine the orientation of the slide device 300 without an electronic and/or interactive trackpad 306. In addition, the trackpad 306 may be implemented separately from the controller 200, such as via a touchscreen, tablet, or mobile device, and the slide device 300 may be used with such a separate trackpad 306.

In some examples, the slide device 300 may be used to interact in a virtual reality (VR) environment. For example, as the user looks in a particular region of the virtual environment, the user may observe and interact with the slide device 300 using a set of "virtual fingers." Depending on whether a VR headset has a camera equipped, a control scheme may include analyzing user's hand movements and mapping those movements to specific actions. In some examples, the slide device 300 may include a plurality of sensors (e.g., capacitive sensors or touch sensors) to sense a user's finger placement so that virtual fingers may be displayed on a same output device (e.g., the output device 350) where the paired digital slide image or WSI is displayed. The virtual fingers may be overlaid on the displayed WSI.

Alternatively, a user may use VR controllers for input. A VR controller may include one or more handle shaped devices designed to be held in each hand. For example, the user may pan the slides by "holding" a slide (pressing a button on the controller) and moving the VR controller in the x-y plane ("dragging gesture"). Users may be able to zoom by rotating the VR controller around the z-axis, or by a "pinching" gesture using both hands. Annotating the slides may be done using the VR controller as well. To annotate, the user may, for example, type using a virtual keyboard, write text or other annotations using a virtual pen or stylus, imitate painting a canvas with a brush, etc., which may be more precise and intuitive than using traditional input methods. The trackpad 306 may also allow annotations via finger or a stylus. Additional functionality may include collaborative analysis between pathologists using VR equipment.

Alternatively or in addition thereto, a user may use a VR headset to view digital slide images or WSIs. The VR headset may provide faster navigation within the digital slide image. Using gaze tracking, areas of interest (identified by a slide analysis tool described below with reference to FIGS. 5A-5C and/or another AI platform or system) around a user's gaze may be highlighted, and a user may focus on a particular area by pushing a button. A user and/or pathologist's gaze during slide analysis may also be captured using this hardware, and may be used in potential AI applications to the slide or digital slide image.

Figure 4A:
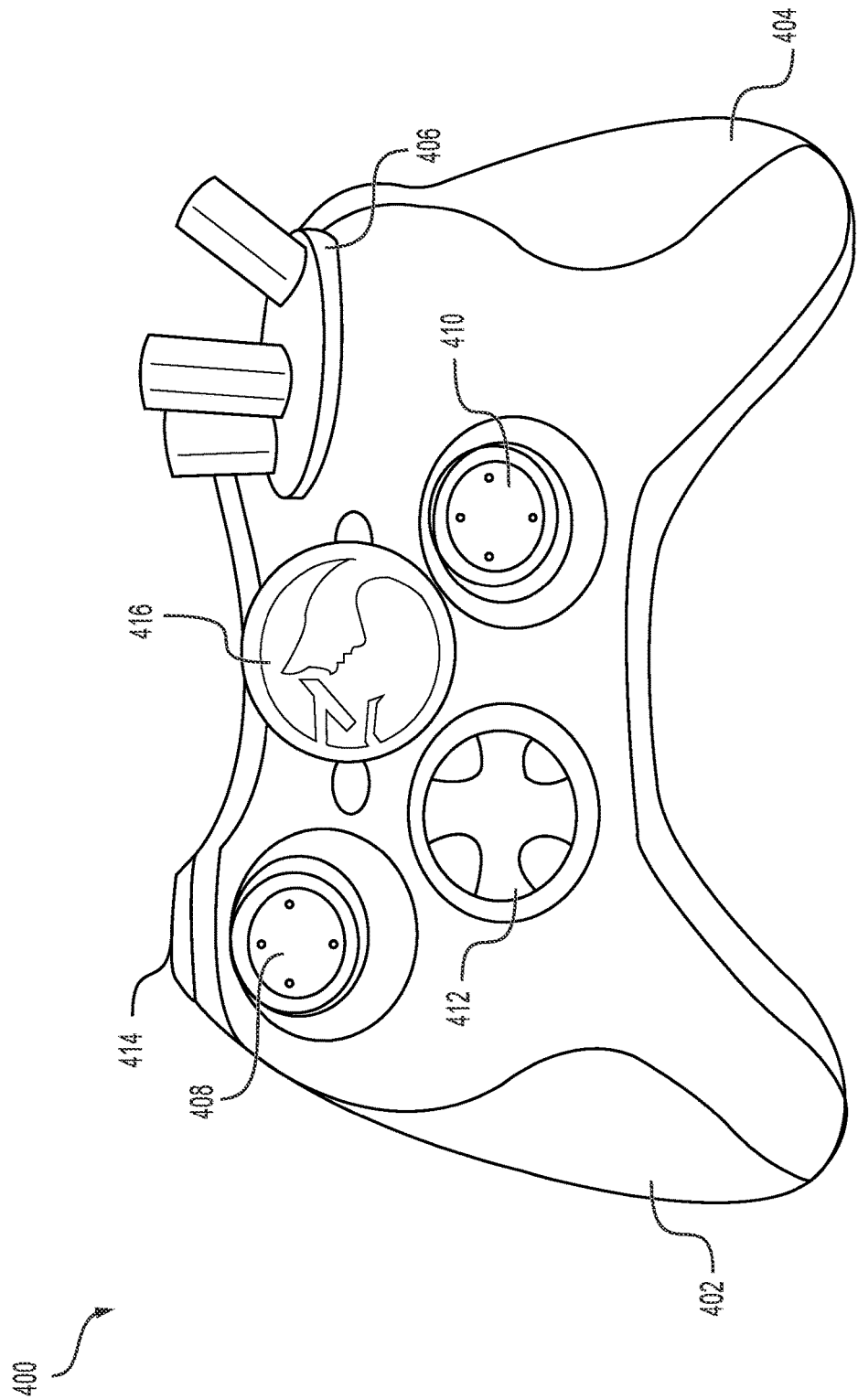
FIGS. 4A and 4B illustrate a gamepad or joypad controller and a separate mock objective assembly according to an exemplary technique presented herein.

Referring to FIG. 4A, as an alternative to a microscope configuration, a controller 400 may be implemented as other familiar controllers, such as those used in gaming. The slide device 300, the trackpad 306, and/or other aspects or techniques disclosed herein may be used in conjunction with the controller 400, but aspects disclosed herein are not limited. For example, the controller 400 may not require the slide device 300 or the trackpad 306 and may simply be used to navigate through digital slide images or WSIs stored on a memory or other device (e.g., computer) and displayed on an output device or display (e.g., the output device 350 in FIG. 3E).

The controller 400 may be implemented as a type of console or video game controller, which may provide a sense of nostalgia or familiarity to a user. FIG. 4A shows an example in which the controller 400 is implemented as a gamepad or joypad. The controller 400 may include two (e.g., first and second or left and right) arms or handles 402, 404 configured to be held in the hands of a user with thumbs provided over an upper surface.

The controller 400 may include many of the similar inputs or buttons as in the controller 200 shown in FIG. 2. For example, the controller 400 may include a mock objective assembly 406 to flip through different visualizations, etc. The mock objective assembly 406 may be formed to resemble the objective assembly of the traditional microscope 100, or other designs may be employed, such that the mock objective assembly 406 may be, for example, simpler, less expensive, more easily manipulated, etc. The mock objective assembly 406 may be used, for example, to change magnification. For example, a user may push mock objective assembly 406, which may cause mock objective assembly 406 to rotate/turn, and such rotation may change the magnification of the displayed image, for example, from 40× to 20×. That is, pushing mock objective assembly 406 may simulate changing objectives on a traditional microscope. Mock objective assembly 406 may be formed so as to have a similar feel and weight as an objective assembly on a traditional microscope so as to give a user an impression of working with a traditional microscope. Other motions of mock objective assembly 406 may be employed for similar functionality, including, for example, depressing, pulling, rotating, etc. Alternatively, mock objective assembly 406 may be fixed in place and may employ other user interfaces, such as a button, switch, or touch surface, to effect similar functionality. The operation of mock objective assembly 406, and the effects of particular manipulations of mock objective assembly 406, may be customized by a user, such as through viewing application tool 508, described below.

The controller 400 may also include inputs familiar to gaming controllers, such as one or more joysticks or analog sticks 408, 410, a directional pad 412, shoulder buttons 414, etc. which may be used, for example, to change an orientation or a position of a digital image or a displayed region of the digital image or whole slide image. Alternatively or in addition thereto, the controller 400 may be used to manipulate the slide device 300. One or more inputs of the controller 400 may also be used to flip through different visualizations (e.g., tissue map, tissue hop, or point of focus), to star slides or number slides or order additional slides to be prepared (e.g. with new or different combination of stains), to increase or decrease magnification, to display a work menu or list, etc. The controller 400 may also include an AI adjustment wheel or sphere 416, which may be similar to AI adjustment wheel 240.

Figure 4B:
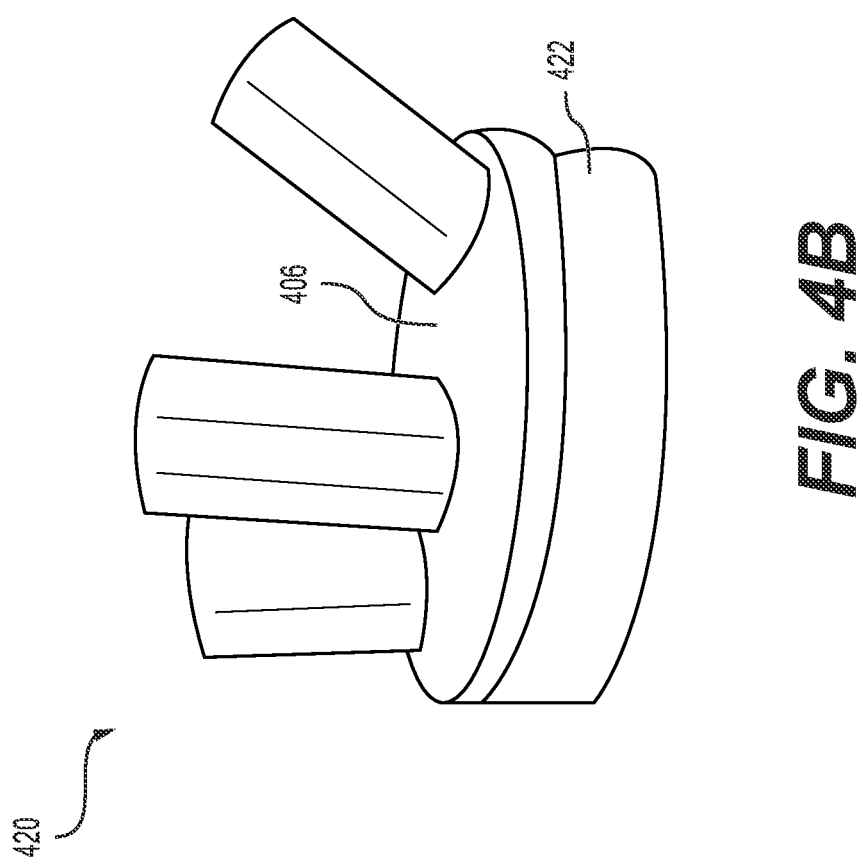

Mock objective assembly 406 may be embodied in a separate component from controller 400, such as objective controller 420 depicted in FIG. 4B. As shown in FIG. 4B, objective controller 420 may include mock objective assembly 406 mounted to a base 422 such that objective controller 420 may be placed on a desktop adjacent to, or separate from, controller 400. The operation of mock objective assembly 406 disposed within objective controller 420 may be the same as described above with respect to controller 400.

Other controls, such as those described above as components of controller 200 depicted in FIG. 2, may be added to or substituted for the above-described elements 408, 410, 412, 414, and 416 of controller 400. For example, the brightness/light intensity control 222, course adjustment knob or wheel 230, or fine adjustment knob or wheel 232, discussed above with respect to controller 200 depicted in FIG. 2, may be included in controller 400 to provide additional or alternative user interfaces.

In addition, the controller 400 may provide feedback (e.g., haptic feedback, tactile feedback, vibrations, sound, light indicators, etc.) when certain options or activities are selected (e.g., to save a slide image or visualization) or if a problem (e.g., wrong orientation of the slide) is detected. In another example, the controller 400 may provide a notification (e.g., an alarm or sound, a light indication such as a blinking light or red light, a vibration, etc.) to indicate that a slide shows features of interest, including features indicative of disease such as cancer, which may be determined by a slide analysis tool described in more detail with reference to FIGS. 5A-5C. In another example, controller 400 may provide different or graded notifications (e.g., shake more strongly or emit different colored lights) based on an analysis, determination, or stored information associated with the slide device 300, such as when viewing high-grade cancer vs. low-grade cancer, which may further be determined by the slide analysis tool.

The controllers 200, 400, slide device 300 and/or trackpad 306, and other aspects and techniques disclosed herein may be used in conjunction with compatible computer hardware and software for visualization WSIs. Techniques disclosed herein may apply hardware and software to provide a method of navigating WSIs that may be optimized for a practice of digital pathology that is familiar and intuitive to pathologists accustomed to navigating glass slides on their own. Furthermore, techniques disclosed herein may overcome inefficiencies and repetitive motion injuries caused by replacing microscope-based image navigation with suboptimal input devices such as a keyboard and mouse.

The various controllers discussed herein (e.g., the controller 200, the slide device 300, the trackpad 306, the controller 400, etc.) may be decoupled from the various output devices (e.g., output device 350, display or touchscreen in trackpad 306, etc.). For example, a regular monitor may be used with VR controllers or with controller-free gesture recognition systems such as Leap Motion.

Figure 5A:
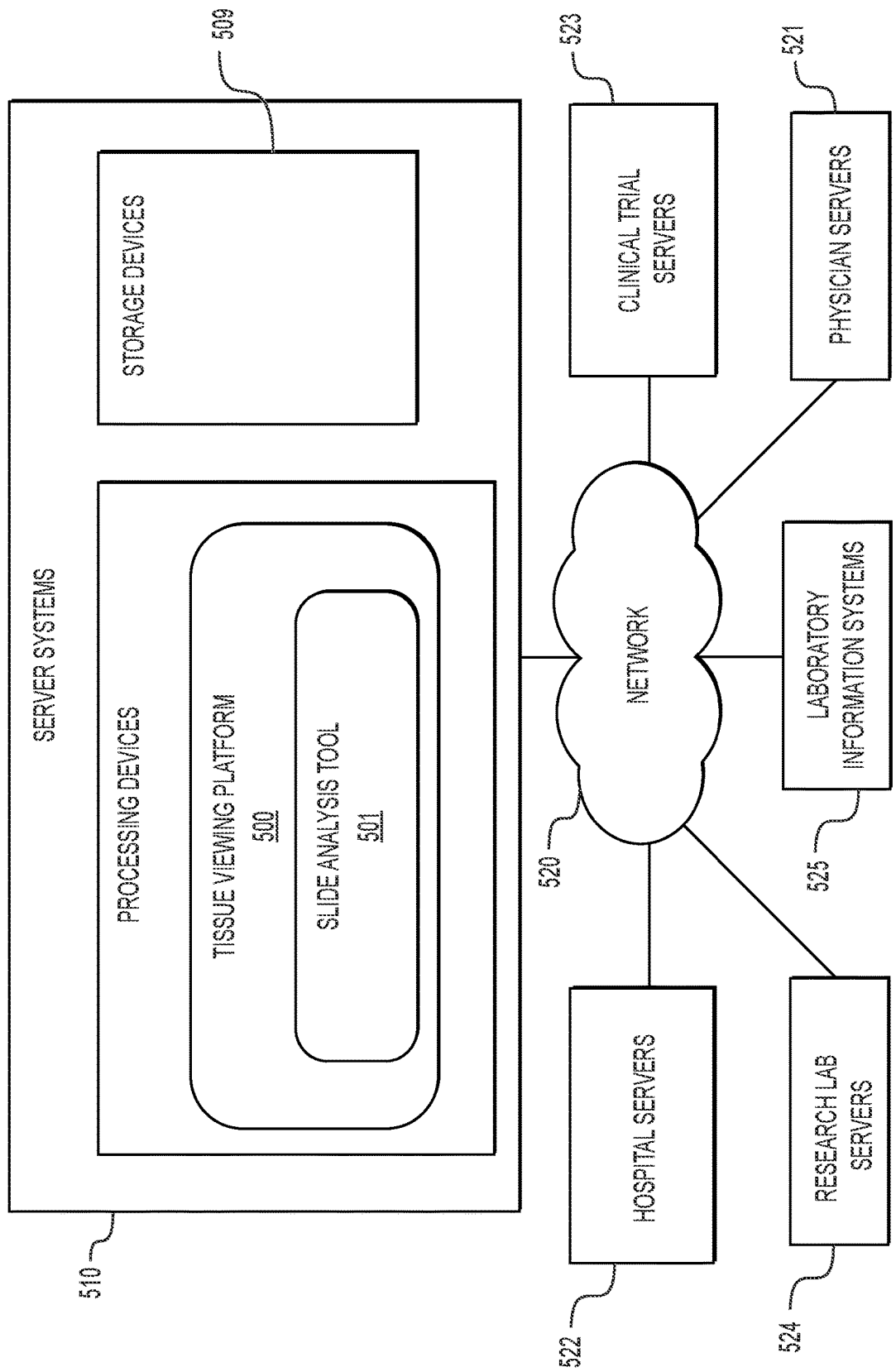
FIG. 5A illustrates an exemplary block diagram of a system and network for processing and viewing digital pathology slides, according to an exemplary technique presented herein.

FIG. 5A illustrates a block diagram of a system and network for processing and viewing digital pathology data, such as digital pathology images and/or digital pathology slides, according to an exemplary technique presented herein.

Specifically, FIG. 5A illustrates an electronic network 520 that may be connected to servers at hospitals, laboratories, and/or doctors' offices, etc. For example, physician servers 521, hospital servers 522, clinical trial servers 523, research lab servers 524, and/or laboratory information systems 525, etc., may each be connected to an electronic network 520, such as, for example, a local area network (LAN), wide area network (WAN), wireless network, the Internet, etc., through one or more computers, servers, and/or handheld mobile devices. According to an exemplary technique presented herein, the electronic network 520 may also be connected to server systems 510, which may include processing devices that are configured to implement a tissue viewing platform 500, which may include a slide analysis tool 501 for determining specimen property or image property information pertaining to digital pathology image(s), and using machine learning to classify a specimen. Slide analysis tool 501 may also be used to facilitate review of an image or other data, using techniques discussed in greater detail below.

The physician servers 521, hospital servers 522, clinical trial servers 523, research lab servers 524, and/or laboratory information systems 525 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 521, hospital servers 522, clinical trial servers 523, research lab servers 524, and/or laboratory information systems 525 may also obtain any combination of patient-specific information, such as age, medical history, cancer treatment history, family history, past biopsy or cytology information, etc. The physician servers 521, hospital servers 522, clinical trial servers 523, research lab servers 524, and/or laboratory information systems 525 may transmit digitized slide images and/or patient-specific information to the server systems 510 over the electronic network 520. The server systems 510 may include one or more storage devices 509 for storing images and data received from at least one of the physician servers 521, hospital servers 522, clinical trial servers 523, research lab servers 524, and/or laboratory information systems 525. The server systems 510 may also include processing devices for processing images and data stored in the one or more storage devices 509. The server systems 510 may further include one or more machine learning tools or capabilities. For example, the processing devices may include one or more machine learning tools for the tissue viewing platform 500, including the slide analysis tool 501. Alternatively or in addition, techniques and/or methods may be performed on a local processing device (e.g., a laptop, a tablet, a desktop computer, a smart phone, etc.).

The physician servers 521, hospital servers 522, clinical trial servers 523, research lab servers 524, and/or laboratory information systems 525 refer to systems used by pathologists for reviewing the images of the slides. In hospital settings, tissue type information may be stored in one of the laboratory information systems 525. However, the correct tissue classification information is not always paired with the image content. Additionally, even if a laboratory information system is used to access the specimen type for a digital pathology image, this label may be incorrect due to the fact that many components of a laboratory information system may be manually input, leaving a large margin for error. According to an exemplary technique presented herein, a specimen type may be identified without needing to access the laboratory information systems 525, or may be identified to possibly correct laboratory information systems 525. For example, a third party may be given anonymized access to the image content without the corresponding specimen type label stored in the laboratory information system. Additionally, access to laboratory information system content may be limited due to its sensitive content.

Figure 5B:
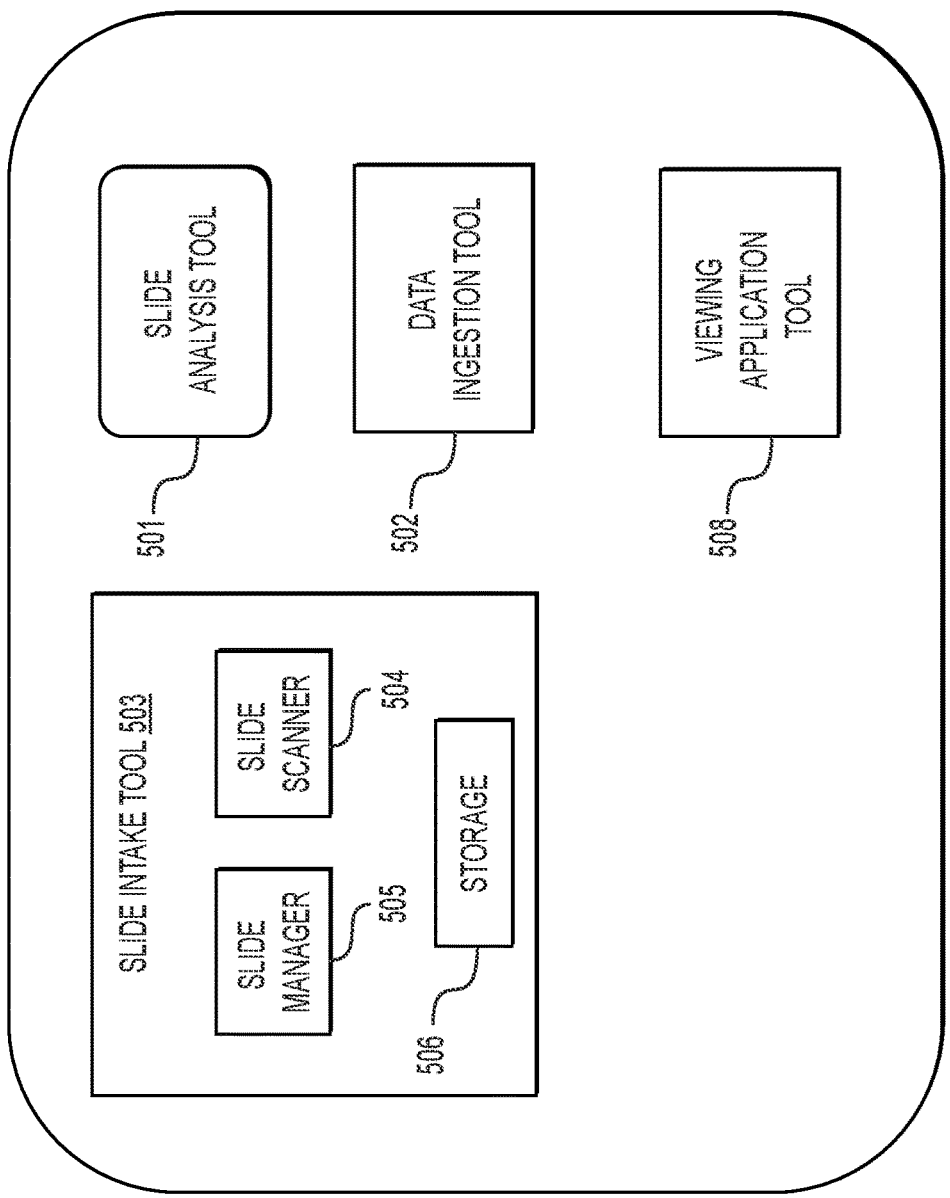
FIG. 5B illustrates an exemplary block diagram of a tissue viewing platform, according to an exemplary technique presented herein.

FIG. 5B illustrates an exemplary block diagram of the tissue viewing platform 500 for determining specimen property of image property information pertaining to digital pathology image(s), using machine learning. For example, the tissue viewing platform 500 may include the slide analysis tool 501, a data ingestion tool 502, a slide intake tool 503, a slide scanner 504, a slide manager 505, a storage 506, and a viewing application tool 508.

The slide analysis tool 501, as described below, refers to a process and system for processing digital images associated with a tissue specimen, and using machine learning to analyze a slide, according to an exemplary technique.

The data ingestion tool 502 refers to a process and system for facilitating a transfer of the digital pathology images to the various tools, modules, components, and devices that are used for classifying and processing the digital pathology images, according to an exemplary technique.

The slide intake tool 503 refers to a process and system for scanning pathology images and converting them into a digital form, according to an exemplary technique. The slides may be scanned with slide scanner 504, and the slide manager 505 may process the images on the slides into digitized pathology images and store the digitized images in the storage 506.

The viewing application tool 508 refers to a process and system for providing a user (e.g., a pathologist) with specimen property or image property information pertaining to digital pathology image(s), according to an exemplary technique. The information may be provided through various output interfaces (e.g., a screen, a monitor, a storage device, and/or a web browser, etc.). Viewing application tool 508 may further provide for specification of user preferences, such as customization of the operation of the various controls and user interfaces disclosed herein.

The slide analysis tool 501, and each of its components, may transmit and/or receive digitized slide images and/or patient information to the server systems 510, physician servers 521, hospital servers 522, clinical trial servers 523, research lab servers 524, and/or laboratory information systems 525 over an electronic network 520. Further, the server systems 510 may include the one or more storage devices 509 for storing images and data received from at least one of the slide analysis tool 501, the data ingestion tool 502, the slide intake tool 503, the slide scanner 504, the slide manager 505, and the viewing application tool 508. The server systems 510 may also include processing devices for processing images and data stored in the storage devices. The server systems 510 may further include one or more machine learning tool(s) or capabilities, e.g., due to the processing devices. Alternatively or in addition, the present disclosure (or portions of the system and methods of the present disclosure) may be performed on a local processing device (e.g., a laptop, a tablet, a desktop computer, a smart phone, etc.).).

Any of the above devices, tools and modules may be located on a device that may be connected to the electronic network 520, such as the Internet or a cloud service provider, through one or more computers, servers, and/or handheld mobile devices.

Figure 5C:
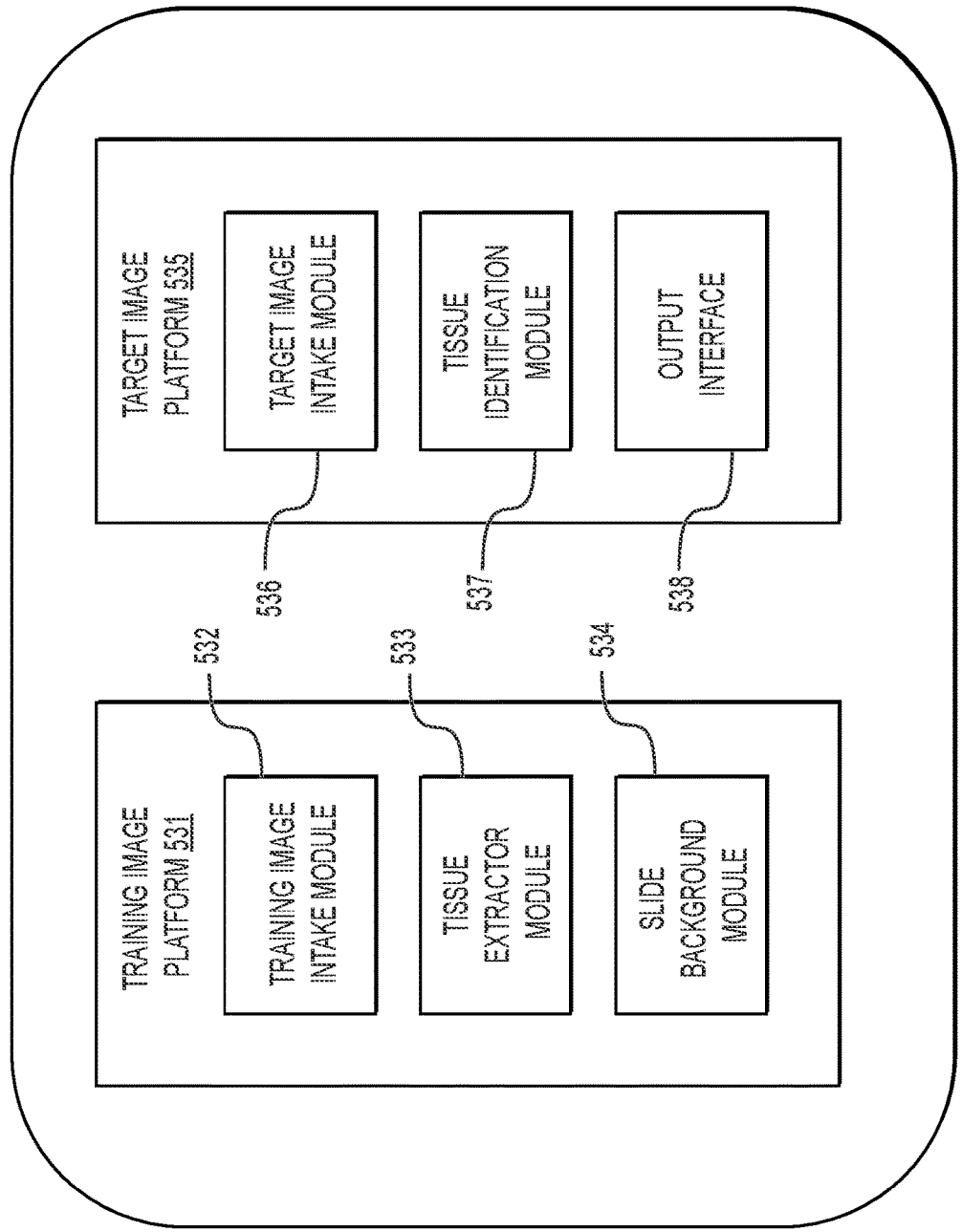
FIG. 5C illustrates an exemplary block diagram of a slide analysis tool, according to an exemplary technique presented herein.

FIG. 5C illustrates an exemplary block diagram of the slide analysis tool 501, according to an exemplary technique presented herein. The slide analysis tool 501 may facilitate review of the digital images associated with a tissue specimen, such as through use AI and/or a machine learning module to determine salient regions or regions of interests from a WSI. The slide analysis tool 501 may identify whether an area belongs to a region of interest or salient region or to a background of a digitized image. A salient region may be a region determined by the slide analysis tool 501 to include certain biomarkers, mutations, or other features indicative of a disease such as a cancerous region. The slide analysis tool 501 may determine a region is salient based upon a feature of interest such as feature size, calcification presence and/or level, color, stain type or color, tissue texture, tissue type, biomarker type, genetic signature, protein type, blood markers, tissue location, inflammation level, and/or combination thereof. A salient region may further be determined by a predetermined confidence that a feature of interest is present, including predicted disease severity, disease stage, associated disease type, disease mortality, and/or combination thereof. The identification of such may trigger an alert to a user and/or an indication that further analysis is required, such as a haptic, audio, and/or visual indication on the controller 200 or 400, trackpad 306, slide device 300, and/or output device 350, etc.

The slide analysis tool may include a training image platform 531 and/or a target image platform 535. The training image platform 531, according to one technique, may create or receive training images that are used to train a machine learning system to effectively analyze and classify digital pathology images. For example, the training images may be received from any one or any combination of the server systems 510, physician servers 521, hospital servers 522, clinical trial servers 523, research lab servers 524, and/or laboratory information systems 525. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized image samples from a 3D imaging device, such as microCT.

The training image intake 532 may create or receive a dataset comprising one or more training images corresponding to either or both of images of a human tissue and images that are graphically rendered. For example, the training images may be received from any one or any combination of the server systems 510, physician servers 521, and/or laboratory information systems 525. This dataset may be kept on a digital storage device. The tissue extractor module 533 may identify tissue within training images that may affect the usability of a digital pathology image. For example, the tissue extractor module 533 may use information about an entire image, e.g., the specimen type, the overall quality of the specimen, the overall quality of the glass pathology slide itself or tissue morphology characteristics, and determine the number of tissues to extract. The slide background module 534 may analyze images of tissues and determine a background within a digital pathology image. It may be useful to identify a background within a digital pathology image, such as, for example, a digital pathology slide, to ensure tissue segments are not overlooked.

According to one technique, the target image platform 535 may include a target image intake module 536, a tissue identification module 537, and an output interface 538. The target image platform 535 may receive a target image and apply the machine learning model to the received target image to determine a characteristic of a target specimen. For example, the target image may be received from any one or any combination of the server systems 510, physician servers 521, hospital servers 522, clinical trial servers 523, research lab servers 524, and/or laboratory information systems 525. The target image intake module 536 may receive a target image corresponding to a target specimen. The tissue identification module 537 may apply the machine learning model to the target image. For example, the tissue identification module 537 may apply the machine learning model to the target image to determine a characteristic of the target specimen. For example, the tissue identification module 537 may detect a specimen type of the target specimen. The tissue identification module 537 may also apply the machine learning model to the target image to determine a quality score for the target image. Further, the tissue identification module may apply the machine learning model to the target specimen to determine whether the target specimen is pretreatment or post-treatment.

The output interface 538 may be used to output information about the target image and the target specimen (e.g., to a screen, monitor, storage device, web browser, etc.).

Figure 6:
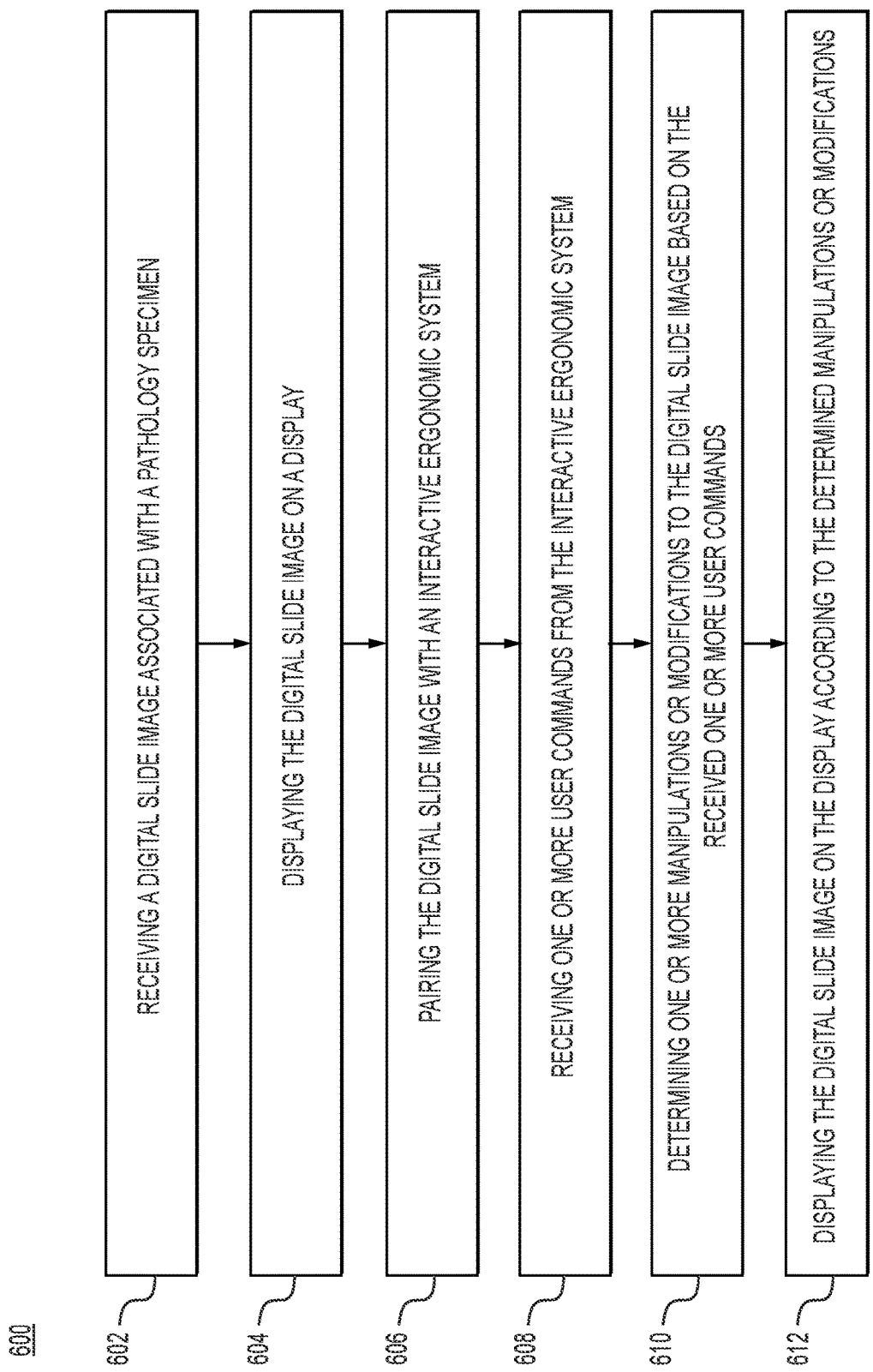
FIG. 6 is a flowchart of an exemplary method for reviewing a digital slide according to an exemplary technique presented herein.

FIG. 6 is a flowchart illustrating an exemplary method for reviewing a digital slide using an interactive system. Some steps may be optional. Exemplary method 600 (i.e., steps 602-612) may be performed by the slide analysis tool 501 automatically or in response to a request from a user.

In step 602, the method 600 may include receiving a digital slide image (e.g., a WSI) associated with a pathology specimen. The digital slide image may be received into a memory or other electronic or digital storage device (e.g., one of storage devices 509).

In step 604, the method 600 may include outputting or displaying the digital slide image on a display (e.g., an external display such as a computer screen or the output device 350 and/or an interactive display such as the touchscreen on the trackpad 306, etc.). In some examples, a virtual trackpad or stage may be displayed along with the digital slide image. The digital slide image may be overlaid on top of the virtual trackpad or stage.

In some examples, step 602 may include receiving a plurality of digital slide images, and step 604 may include displaying a selected digital slide image that has been selected from the received digital slide images. The selected digital slide image may be selected by a user or a selection algorithm (e.g., a basic algorithm selecting the first digital slide image in the one or more received digital slide images). In some examples, the method 600 may include a selection step of selecting the digital slide image to display.

In step 606, the method 600 may include pairing the received (and/or selected) digital slide image with an interactive system. For example, as discussed above, a unique identification of a slide device 300 may allow for slide device 300 to be uniquely paired with an item of information, such as a digital image or WSI of a previously captured or acquired specimen. Such a unique pairing may allow for automatic retrieval of the paired information when the slide device 300 is selected. Such automatic retrieval may be initiated, for example, when the slide device 300 is presented to a reader, such as an NFC or RFID reader (not shown). An NFC or RFID reader may be provided as part of the trackpad 306, the controller 200, and/or as an external device. The interactive system may include at least one ergonomic device configured to enhance or improve user ergonomics and/or comfort and/or configured to reduce user fatigue, such as the slide device 300, the trackpad 306, the controller 200, and/or the controller 400. As such, the interactive system may alternatively be referred to as an "interactive ergonomic system." In some examples, the interactive system may omit typical input devices, such as a keyboard and/or mouse.

For example, the interactive system may include the slide device 300 and the controller 200 including the stage 206, which may include the trackpad 306. In step 606, the digital slide image may be paired with the slide device 300 (e.g., to enable movement and/or orientation of the digital slide image via the slide device 300) and the controller 200 (e.g., to enable zooming or panning of the digital image, or selecting of a new digital slide image to be paired with the interactive system via the controller 200). As an alternative example, the interactive system may include the controller 200, but not the slide device 300 or the trackpad 306, and the digital slide image may be paired to the controller 200 to be manipulated by the AI adjustment wheel 240 but not necessarily a movement on the stage 206 and/or a slide.

As another example, the interactive system may include the slide device 300 and the trackpad 306 implemented as a touch screen. In step 606, the digital slide image may be paired with the slide device 300 (e.g., to enable movement and/or orientation of the digital slide image via the slide device 300). In step 606, the digital slide image may also be paired with the trackpad 306 for further manipulation.

In yet another example, the interactive system may include the controller 400, and in step 606, the digital slide image may be paired with the controller 400.

In step 608, the method 600 may include receiving one or more user commands from the interactive system. The one or more user commands may come from the ergonomic device. The one or more user commands may be a movement or orientation command when a user manipulates the slide device 300 (and/or the controller 200 or 400), zoom and/or pan commands when a user manipulates the controller 200, trackpad 306, and/or controller 400, a command to switch to a new paired digital image (by pressing a button on the controller 200, trackpad 306, and/or controller 400, by performing a gesture on slide device 300 and/or trackpad 306, etc.), an annotation command to annotate the digital slide image (by pressing a button on the controller 200, trackpad 306, and/or controller 400, by performing a gesture on slide device 300 and/or trackpad 306, etc.), an archive or save command to archive or save a digital slide image, a marking command to mark or flag the digital slide image, etc.

In some examples, step 608 may include receiving other signals from the interactive system, such as signals indicating a position or orientation of a user's fingers as sensed by the slide device 300 and/or trackpad 306.

In step 610, the method 600 may include determining one or more manipulations or modifications to the digital slide image based on the received one or more user commands, and in step 612, the method 600 may include displaying the digital slide image on the display according to the determined manipulations or modifications. The displayed digital slide image may be referred to as a modified digital slide image. Steps 610 and/or 612 may be performed in real time such that the display of the digital slide image may change and/or update in real-time.

For example, as a user moves the slide device 300 across the trackpad 306 and/or stage 206, the digital slide image displayed on the display may move in a corresponding direction. As another example, as a user manipulates the joystick 408, 410 or other buttons on the controller 400 or moves the controller 400 in a certain direction, the digital slide image displayed on the display may move in a corresponding direction along with the user's movement. As a user manipulates zoom and/or magnifying controls (e.g., by manipulating mock objective assembly 228, AI adjustment wheel 240, and/or other inputs or buttons on the controller 200, or by manipulating the joystick 408, 410 or other buttons on the controller 400 or by moving the controller 400, or by using certain gestures with the trackpad 306 and/or on the slide device 300), the digital slide image displayed on the display may be zoomed and/or magnified accordingly. For example, by pushing on joystick 408 or 410, the digital slide image may be zoomed in or out. As the user submits annotations, flags, or other markings or indicators (e.g., by writing on the trackpad 306 or via other buttons or controls, such as a star button or the archive button 242 on the controller 200), the annotations, flags, markings, indicators, etc. may appear on the display digital slide image.

If the user submits commands to advance to a new digital slide image and/or to pair a new or next digital slide image with the interactive system (e.g., by swapping out one slide device 300 for another, by performing a certain gesture such as a swiping gesture on the slide device 300 or the trackpad 306, by pressing certain buttons on the controller 200 or the controller 400, etc.), then steps 604 and 608 may be repeated so that the newly paired digital slide image is displayed on the display in accordance with the user command.

In some examples, if in step 608, signals were received indicating a position or orientation of a user's signals on the slide device 300 and/or the trackpad 306, step 610 may include determining manipulations or modifications to the digital slide image accordingly, and in step 612, the digital slide image (and/or a digital or virtual trackpad displayed) may display virtual fingers representing the user's fingers.

In some examples, the method 600 may include outputting a notification or feedback on the display or to the interactive system (e.g., vibrations on the controller 400) based on user commands. In some examples, the method 600 may include receiving commands, indications, or other information from the slide analysis tool 501, and outputting a notification or feedback on the display or to the interactive system (e.g., vibrations on the controller 400) based on the received commands, indications, or other information from the slide analysis tool, such as when a digital slide image contains a salient region or cancerous region, or when a portion of the digital slide image now shown and/or magnified on the display contains a salient region or cancerous region.

Figure 7:
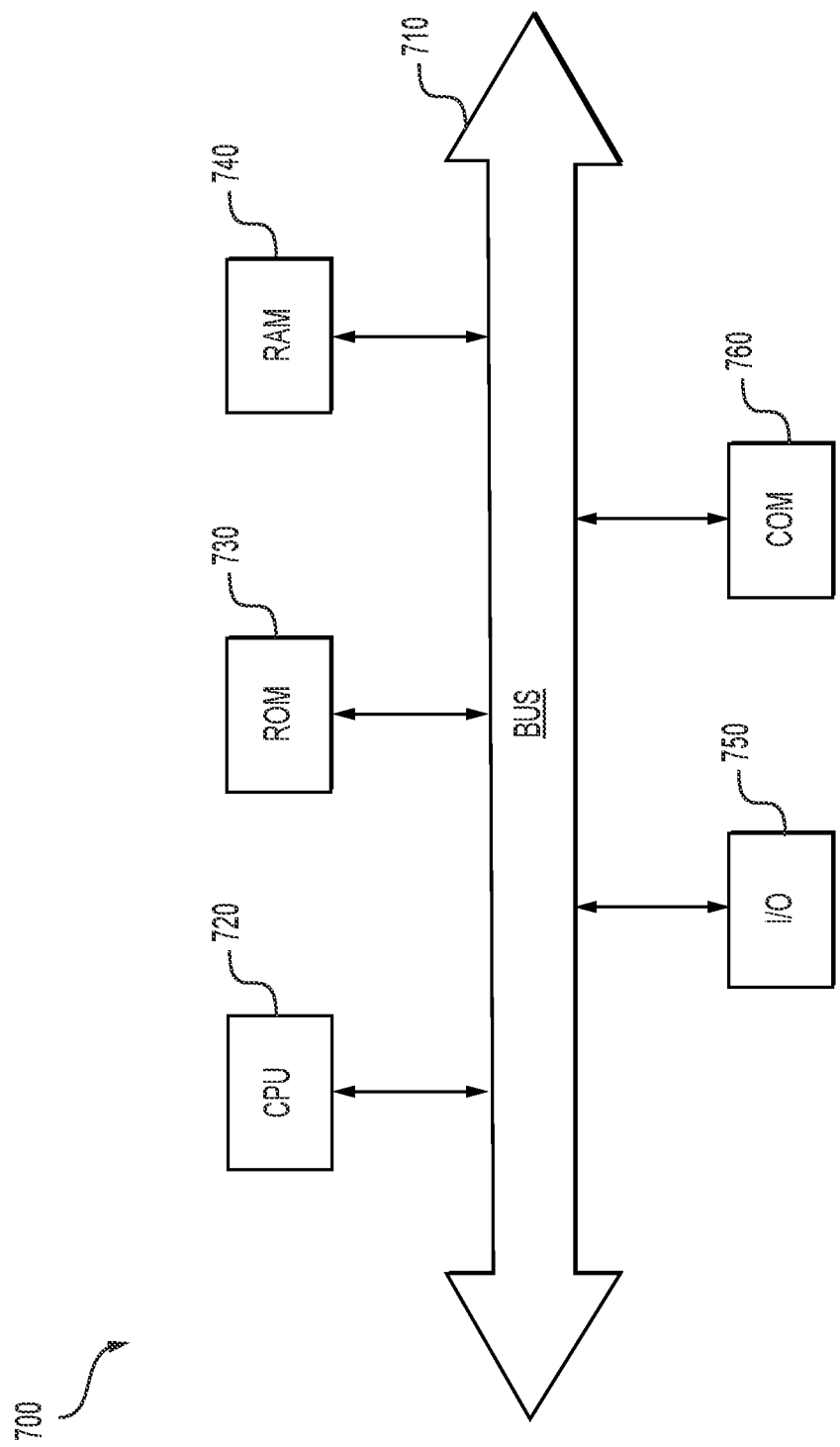
FIG. 7 depicts an exemplary system that may execute techniques presented herein.

As shown in FIG. 7, device 700 may include a central processing unit (CPU) 720. CPU 720 may be any type of processor device including, for example, any type of special purpose or a general-purpose microprocessor device. As will be appreciated by persons skilled in the relevant art, CPU 720 also may be a single processor in a multi-core/multi-processor system, such system operating alone, or in a cluster of computing devices operating in a cluster or server farm. CPU 720 may be connected to a data communication infrastructure 710, for example a bus, message queue, network, or multi-core message-passing scheme.

Device 700 may also include a main memory 740, for example, random access memory (RAM), and also may include a secondary memory 730. Secondary memory 730, e.g. a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 730 may include similar means for allowing computer programs or other instructions to be loaded into device 700. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 700.

Device 700 also may include a communications interface ("COM") 760. Communications interface 760 allows software and data to be transferred between device 700 and external devices. Communications interface 760 may include a modem, a network interface (such as an Ethernet card), a communications port, a PCMCIA slot and card, or the like. Software and data transferred via communications interface 760 may be in the form of signals, which may be electronic, electromagnetic, optical or other signals capable of being received by communications interface 760. These signals may be provided to communications interface 760 via a communications path of device 700, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 700 may also include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

One or more techniques presented herein may enable a user, e.g., a pathologist, to better interact with a digital image of a glass slide that may be presented on a screen, in a virtual reality environment, in an augmented reality environment, or via some other form of visual display. One or more techniques presented herein may enable a natural interaction closer to traditional microscopy with less fatigue than using a mouse, keyboard, and/or other similar standard computer input devices.

The disclosed techniques may be implemented anywhere that digital pathology is practiced, such as in hospitals, clinics, labs, and pathologists' satellite or home offices. The techniques may use standard technology for facilitating connections between input devices and computers, namely USB ports and Bluetooth (wireless), and may include customer drivers and software for programming, calibrating, and allowing inputs from the device to be received properly by the computer and visualization software.

One of the techniques presented herein may consist of a "stage" in which the user moves a "slide device" which may be manipulated by the user to alter the information displayed on the screen in a manner similar to movement on the mechanical stage of FIG. 1, in traditional microscopy. The stage may be physical or virtual. A physical representation of the stage may be a touchpad/trackpad device with sensors (e.g., capacitive sensing device, a resistive touchscreen, etc.). A virtual stage may simply be a region of the environment, e.g., the user's desk, in which the slide device is monitored (e.g., with a camera, sensors, etc.) to observe how it moves.

The controllers disclosed herein may be comfortable for a user to control. The controllers disclosed herein may be implemented anywhere that digital pathology is practiced, namely in hospitals, clinics, labs, and pathologists' satellite or home offices. Standard technology may facilitate connections between input devices and computers (USB ports, Bluetooth (wireless), etc.) and may include customer drivers and software for programming, calibrating, and allowing inputs from the device to be received properly by a computer and visualization software.

The foregoing general description is exemplary and explanatory only, and not restrictive of the disclosure. Other embodiments of the invention may be apparent to those skilled in the art from consideration of the specification and practice of the invention disclosed herein. It is intended that the specification and examples be considered as exemplary only.

What is claimed is:

1. A computer-implemented method of reviewing digital pathology data, the method comprising:
   receiving a digital pathology image into a digital storage device, the digital pathology image being associated with a patient;
   providing for display the digital pathology image on a display;
   pairing the digital pathology image with a physical token of the digital pathology image in an interactive system, the system including a control to select a visualization of the digital pathology image;
   receiving one or more commands from the interactive system indicating a selected visualization of the digital pathology image;
   determining one or more manipulations or modifications to the displayed digital pathology image based on the selected visualization; and
   providing for display a modified digital pathology image on the display according to the determined one or more manipulations or modifications.

2. The computer-implemented method of claim 1, the method further comprising:
   receiving information of a position or an orientation of the physical token from one or more sensors included in the physical token.

3. The computer-implemented method of claim 1, the method further comprising:
   receiving information of a position or an orientation of the physical token from one or more sensors included in a surface configured to support the physical token.

4. The computer-implemented method of claim 3, wherein the interactive system further includes a mock microscope, the mock microscope including a stage, and the surface being incorporated in the stage of the mock microscope.

5. The computer-implemented method of claim 3, wherein the
   selected visualization is one of a tissue map visualization, a tissue hop visualization, or a point of focus visualization.

6. The computer-implemented method of claim 1, wherein the one or more commands further include a change in a position or an orientation of the physical token.

7. The computer-implemented method of claim 6, wherein the one or more commands further include instructions to rotate the digital pathology image or adjust a zoom level of the digital pathology image according to the change in the position or the orientation of the physical token.

8. The computer-implemented method of claim 6, wherein the one or more commands further include navigation of the digital pathology image according to the change in the position or the orientation of the physical token.

9. The computer-implemented method of claim 6, wherein providing for display the modified digital pathology image on the display includes providing for display a movement of the digital pathology image that corresponds to a movement of the physical token indicated by the change in the position or the orientation of the physical token.

10. The computer-implemented method of claim 1, wherein receiving the digital pathology image includes receiving a plurality of digital pathology images, the digital image displayed is selected from the plurality of digital pathology images, and the one or more commands includes instructions to advance to another digital pathology image of the plurality of digital pathology images.

11. A system for reviewing digital pathology data, the system comprising:
   a data storage device storing instructions for reviewing digital pathology data in an electronic storage medium; and
   a processor configured to execute the instructions to perform operations comprising:
   receiving a digital pathology image into a digital storage device, the digital pathology image being associated with a patient;
   providing for display the digital pathology image on a display;
   pairing the digital pathology image with a physical token of the digital pathology image in an interactive system, the system including a control to select a visualization of the digital pathology image;
   receiving one or more commands from the interactive system indicating a selected visualization of the digital pathology image;
   determining one or more manipulations or modifications to the displayed digital pathology image based on the selected visualization; and providing for display a modified digital pathology image on the display according to the determined one or more manipulations or modifications.

12. The system of claim 11, wherein the operations further comprise:
receiving information of a position or an orientation of the physical token from one or more sensors included in the physical token or from one or more sensors included in a surface configured to support the physical token.

13. The system of claim 11, wherein the selected visualization is one of a tissue map visualization, a tissue hop visualization, or a point of focus visualization.

14. The system of claim 11, wherein the one or more commands further include a change in a position or an orientation of the physical token.

15. The system of claim 14, wherein providing for display the modified digital pathology image on the display includes providing for display a movement of the digital pathology image that corresponds to a movement of the physical token indicated by the change in the position or the orientation of the physical token.

16. A non-transitory machine-readable medium storing instructions that, when executed by a computing system, causes the computing system to perform operations for reviewing digital pathology data, the operations comprising:
receiving a digital pathology image into a digital storage device, the digital pathology image being associated with a patient;
providing for display the digital pathology image on a display;
pairing the digital pathology image with a physical token of the digital pathology image in an interactive system, the system including a control to select a visualization of the digital pathology image;
receiving one or more commands from the interactive system indicating a selected visualization of the digital pathology image;
determining one or more manipulations or modifications to the displayed digital pathology image based on the selected visualization; and
providing for display a modified digital pathology image on the display according to the determined one or more manipulations or modifications.

17. The non-transitory machine-readable medium of claim 16, the operations further comprising:
receiving information of a position or an orientation of the physical token from one or more sensors included in the physical token or from one or more sensors included in a surface configured to support the physical token.

18. The non-transitory machine-readable medium of claim 16,
wherein the selected visualization is one of a tissue map visualization, a tissue hop visualization, or a point of focus visualization.

19. The non-transitory machine-readable medium of claim 16, wherein the one or more commands further include a change in a position or an orientation of the physical token.

20. The non-transitory machine-readable medium of claim 19, wherein displaying the modified digital pathology image on the display includes displaying a movement of the digital pathology image that corresponds to a movement of the physical token indicated by the change in the position or the orientation of the physical token.

* * * * *